| United States Patent [19] | [11] | 4,242,479 |
|---|---|---|
| Yokota et al. | [45] | Dec. 30, 1980 |

[54] PROCESS FOR PRODUCING AN IMPROVED ETHYLENIC POLYMER

[75] Inventors: Yoshihisa Yokota; Teruo Hosokawa, both of Yokohama; Kiichiro Sakashita, Kawasaki, all of Japan

[73] Assignee: Showa Yuka Kabushiki Kaisha, Tokyo, Japan

[21] Appl. No.: 863,560

[22] Filed: Dec. 22, 1977

[30] Foreign Application Priority Data

Dec. 23, 1976 [JP] Japan .................. 51/154218
Nov. 28, 1977 [JP] Japan .................. 52/141487
Dec. 13, 1977 [JP] Japan .................. 52/148780

[51] Int. Cl.³ .......................... C08F 4/02; C08F 10/02
[52] U.S. Cl. ............................... 526/124; 252/429 B; 252/429 C; 526/128; 526/139; 526/348.5; 526/348.6; 526/352
[58] Field of Search ............................ 526/124, 125

[56] References Cited

U.S. PATENT DOCUMENTS

| 3,718,636 | 2/1973 | Stevens et al. | 526/124 |
|---|---|---|---|
| 3,819,599 | 6/1974 | Fotis et al. | 526/124 |
| 3,901,863 | 8/1975 | Berger et al. | 526/124 |
| 3,987,233 | 10/1976 | Sato et al. | 526/122 |
| 4,071,672 | 1/1978 | Kashiwa | 526/122 |
| 4,085,276 | 4/1978 | Toyota et al. | 526/122 |
| 4,107,416 | 8/1978 | Giannini et al. | 526/125 |

FOREIGN PATENT DOCUMENTS

| 2324766 | 1/1974 | Fed. Rep. of Germany | 526/125 |
|---|---|---|---|
| 2455415 | 5/1975 | Fed. Rep. of Germany | 526/124 |
| 2504036 | 8/1975 | Fed. Rep. of Germany | 526/125 |
| 1275641 | 5/1972 | United Kingdom | 526/124 |
| 1286867 | 8/1972 | United Kingdom | 526/906 |
| 1292853 | 10/1972 | United Kingdom | 526/906 |

Primary Examiner—Edward J. Smith
Attorney, Agent, or Firm—Sughrue, Rothwell, Mion, Zinn and Macpeak

[57] ABSTRACT

A process for polymerizing ethylene or copolymerizing ethylene with an α-olefin in the presence of a catalyst comprising: (A) a solid catalyst ingredient obtained by contacting (1) a solid reaction product prepared by reacting (a) a reaction product of an aluminum trihalide with an organic compound containing an Si—O bond and/or an ether compound and (b) a magnesium alcoholate with (2) a tetravalent titanium compound containing at least one halogen atom or further (3) an electron donor compound, and (B) an organo-aluminum compound.

68 Claims, 1 Drawing Figure

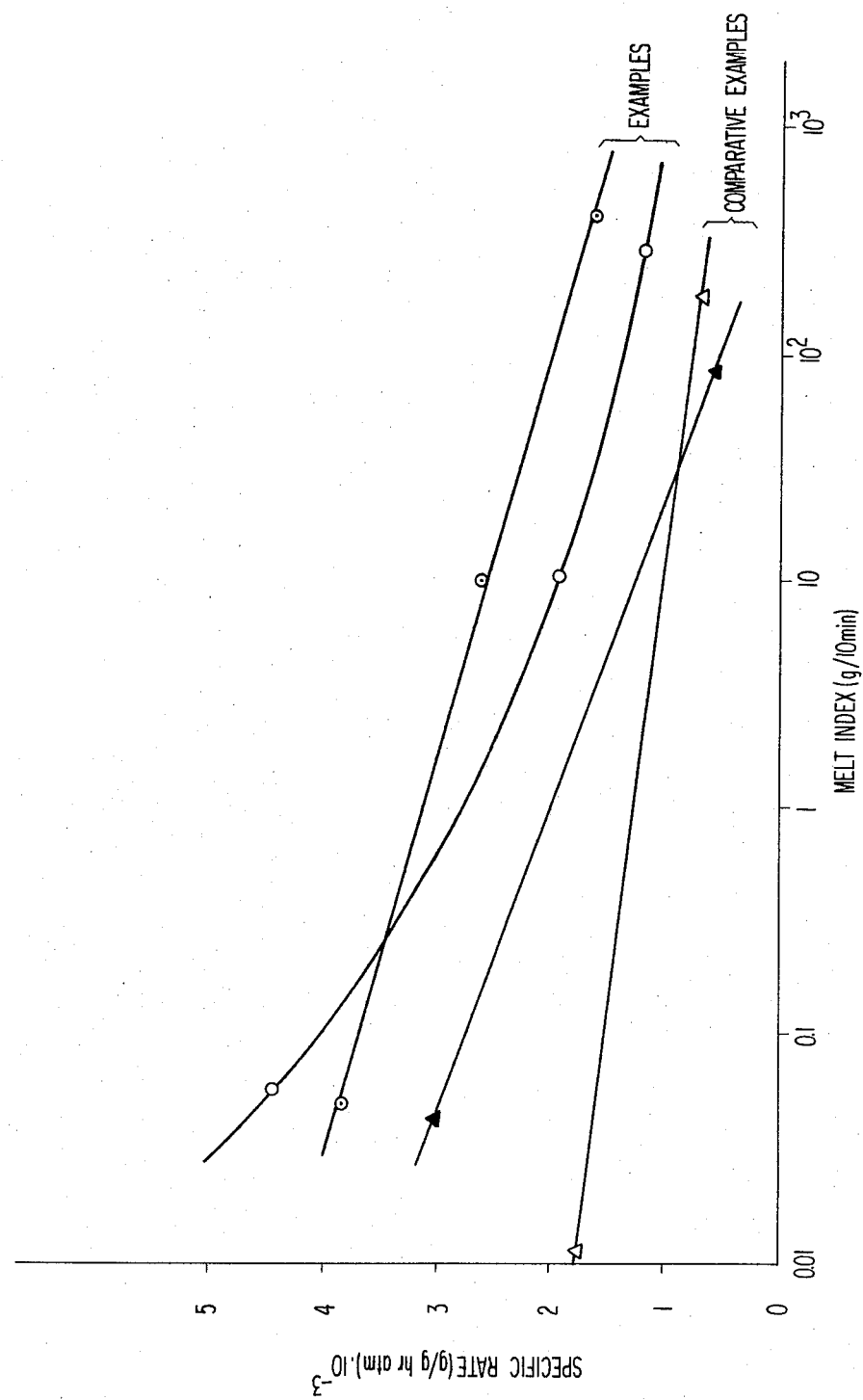

PROCESS FOR PRODUCING AN IMPROVED ETHYLENIC POLYMER

BACKGROUND OF THE INVENTION

1. Field of the Invention

This invention relates to a process for producing an ethylenic polymer. Specifically, the invention relates to a process for producing an ethylenic polymer by polymerizing ethylene or copolymerizing ethylene with another α-olefin using a novel catalyst system having superior polymerization activity. More specifically, the invention relates to an improved process for producing an ethylenic polymer which comprises polymerizing ethylene or copolymerizing ethylene with another olefin by using a catalyst system obtained from a solid catalyst ingredient prepared by contacting a tetravalent titanium compound with a pre-treated carrier and an organoaluminum compound, which catalyst system has superior polymerization activity and can afford a copolymer of ethylene and another α-olefin in which the distribution of short-chain branches with regard to its molecular weight (the distribution of the degree of branching) is relatively uniform.

2. Description of the Prior Art

In recent years, a number of suggestions have been made about improved catalysts for polymerization of ethylene with or without other α-olefins which comprise transition metal halides (especially halogen compounds of titanium) supported on a carrier (especially a compound of a divalent metal, especially magnesium) optionally pre-treated with a certain specific compound. These catalysts have been alleged to have a markedly increased polymerization activity per unit weight of catalyst (catalytic activity) and to permit substantially omission of the step of removing the catalyst residue from the resulting polymers after the end of polymerization.

Examples of the carrier used in these catalysts are magnesium compounds such as magnesium hydroxychloride, magnesium oxide, magnesium alcoholates, magnesium hydroxide and magnesium dihalides. Products obtained by pre-treating these magnesium compounds with such compounds as water, alcohols, aldehydes, ketones, esters, ethers or carboxylic acids have also been suggested.

These carriers or their pre-treated products have led to a marked increase in polymerization activity, but none have proved to be entirely satisfactory in the polymerization of ethylene with or without other olefins. Among the difficulties associated with these carriers are:

(1) The catalysts do not have sufficiently feasible polymerization activity. Although they have high activity for a relatively short period of time, they will be heavily deactivated with time. Hence, their productivities in long-term polymerization are low.

(2) The bulk density of the resulting polymer is too low. Hence, the productivity of the polymerization apparatus decreases.

(3) With these catalysts, the effect of a molecular weight regulator (generally, hydrogen) used to control the melt flow index of the resulting polymer is relatively small. Hence, polymers having a high melt index cannot be obtained unless the molecular weight regulator is used in a relatively large amount (in the case of using hydrogen, its partial pressure is elevated), or the polymerization is performed at high temperatures.

(4) With these catalysts, the reactivity of the other olefin as a comonomer in copolymerization with ethylene is poor, and therefore, high concentration of the comonomer are required. In other words, since the conversion of the comonomer is lower than that of ethylene, the comonomers is wasted.

(5) In copolymerization of ethylene with other olefins using these catalysts, the uniformity of the distribution of the branching degree of the copolymer is insufficient (branching is considerably distributed in low-molecular-weight copolymers, but it is scarcely distributed in high-molecular-weight copolymers). Hence, the copolymers cannot exhibit sufficient performance.

In the high-density polyethylene industry, copolymers of ethylene with other olefins are widely produced, and most of the molding materials for blow molding, stretching, film formation, etc. are the copolymers.

The basic properties of these copolymers are greatly determined by the amount and distribution of the comonomers introduced into the ethylene chain. In particular, the number of short-chain branches present in the high-molecular-weight portion greatly affects the basic properties of the polymers such as the crystalline structure, the degree of crystallization, and the rate of crystallization, and also many practical properties such as resistance to environmental stress cracking, film strength, softness, and moldability.

For these reasons, it is very important from the viewpoint of improving practical properties to control the number and distribution of short-chain branches in an ethylene copolymer.

The distribution of the degree of branching in the copolymer seems to be greatly affected by such factors as the copolymerization reactivity with the comonomer and the ease of chain transfer by a molecular weight regulator (especially, hydrogen). In copolymers of ethylene and olefins obtained by conventional catalyst systems such as an organoaluminum compound (for example, trialkyl aluminums)-titanium trichloride system and an organoaluminum compound-titanium tetrachloride system, short-chain branches are present mainly in the low-molecular-weight portion. Hence, they reduce the density of the copolymer and increases its hydrocarbon-soluble portion, and cannot greatly change the basic properties of the polymer such as its melting point and the rate of crystallization.

The reactivity of the comonomer in copolymerization also appears to have closely to do with the distribution of the degree of branching. Particularly, in the case of copolymerization of ethylene with an olefin containing at least 4 carbon atoms, the conversion of the comonomer is a major factor of the cost of production.

When the performances of prior art catalysts for copolymerization of ethylene with olefins which are based on a halogen compound of titanium supported on a carrier obtained by pre-treating the magnesium compounds with the electron donor are examined, it is found that the uniformity of the distribution of the degree of branching and the reactivity of the comonomer are considerably improved as compared with unsupported transition metal compound catalysts, but are not entirely satisfactory. In particular, these prior art catalyst systems decrease drastically in polymerization activity with time. Hence, all of these properties should be greatly improved.

The problem in commercial application of catalyst systems having a high initial polymerization activity but a tendency to be deactivated greatly with time is that even if the average polymerization time is prolonged, the productivity (the output per unit amount of catalyst) does not increase, and moreover, this causes great troubles to the operation of the process, such as the risk of radicality of the polymerization reaction and the difficulty of controlling the reaction temperature.

Many methods involving the use of magnesium alcoholates as the aforesaid carrier have been suggested. They include, for example, the following.

(1) Method in which a reaction product formed between a magnesium alcoholates and a tetravalent titanium compound is used as a solid catalyst ingredient.

(2) Method in which a magnesium alcoholates is contacted with an alkyl aluminum halide and then the product is reacted with a transition metal halide.

(3) Method in which a titanium tetraalkoxide is reacted with a magnesium alcoholates and the reaction product is reacted with silicon tetrachloride.

(4) Method in which a magnesium alcoholates is reacted with a halogenating agent, and then a transition metal compound is supported on the product.

When ethylene is polymerized, or copolymerized with another olefin, in the presence of catalyst systems obtained from the transition metal compounds supported on a carrier by these methods and an organometal compound (especially, an organoaluminum compound), the aforesaid problems cannot be completely solved, and therefore, these catalysts are neither satisfactory for practical purposes.

Thus, in spite of the fact that ethylenic polymers, above all copolymers of ethylene with olefins, have attained an increasingly important status in commercial production because of their broad range of utility, there has been scarcely any suggestion about catalyst systems which are suitable for producing ethylenic polymers having improved basic properties.

SUMMARY OF THE INVENTION

On various extensive investigations, the present inventors have found that an ethylenic polymer can be obtained with high polymerization activity by polymerizing ethylene, or copolymerizing ethylene with another α-olefin, in the (A) a solid catalyst ingredient obtained by contacting (1) a solid reaction product prepared by reacting (a) a reaction product of an aluminum trihalide with an organic compound containing an Si—O bond and/or an ether compound and (b) a magnesium alcoholate with (2) a tetravalent titanium compound containing at least one halogen atom or further (3) an electron donor compound, and (B) an organoaluminum compound. an organic compound containing an Si—O bond (to be referred This discovery led to the accomplishment of the present invention.

The advantages obtained by this invention in polymerizing ethylene or copolymerizing ethylene with another olefin in the presence of the catalyst system obtained as above are as follows:

(1) The catalyst system is highly active. Thus, the content of the catalyst residue in the resulting polymer is extremely low, and the step of removing the catalyst residue from the resulting polymers can be substantially omitted.

(2) Since the resulting polymer has a relatively high bulk density, each steps of the polymerizing, drying and conveying the resulting polymer has superior productivity.

(3) Since the catalyst system undergoes little deactivation during polymerization, it can be used for fairly long periods of time.

(4) The effect of a molecular weight regulator (for example, hydrogen) in producing a polymer having a high melt index is superior. Accordingly, even when its amount is relatively small, it can fully exhibits its superior effect.

(5) Since the content of a portion soluble in the polymerization solvent is low, the amount of matter adhering to the apparatus in the polymerization step is small. Hence, a polymer can be produced without difficulty.

In the copolymerization of ethylene with other olefins, the process of the invention further has the following advantages.

(1) Since the distribution of the degree of branching in the resulting copolymer is relatively uniform irrespective of its molecular weight, the copolymer has good resistance to environmental stress cracking.

(2) Since the copolymerizability of the other olefin as a comonomer is good, the conversion of the comonomer is higher than with other catalyst systems.

(3) Ethylenic polymers having a relatively low density (about 0.920 g/cc) can be prepared by slurry polymerization at relatively low temperature (generally, not more than 100° C.). Accordingly, the resulting polymer is easy to recover.

BRIEF DESCRIPTION OF THE DRAWINGS

The drawing shows plots of the specific rate of copolymerization versus the melt index of copolymer.

DETAILED DESCRIPTION OF THE INVENTION (a) Aluminum trihalide

Preferably, the aluminum trihalides used in this invention ($AlX_3$ in which X is a halogen atom) are anhydrous. Typical examples of the anhydrous aluminum trihalides are aluminum trichloride, aluminum trifluoride and aluminum tribromide. Aluminum trichloride is especially suitable.

(b) Silicon-containing compound

Examples of the silicon-containing organic compounds which can be used in the invention are represented by general formulae (I), (II) and (III).

$Si(OR^1)_a R^2_b$  (I)

$R^3(R^4_2SiO)_d SiR^5_3$  (II)

$(R^6_2SiO)_e$  (III)

In formulae (I), (II) and (III), $R^1$, $R^2$ and $R^6$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of these hydrocarbon radicals substituted with at most 3 halogen atoms or alkoxy radicals having at most 20 carbon atoms, $R^2$ represents a hydrogen atom or a halogen atom too. $R^3$, $R^4$ and $R^5$ are the same or different, and represent the above-mentioned hydrocarbon, radicals substituted derivatives, or a halogen atom, $a+b$ is 4 (with the proviso that a is not 0), d is an integer of from 1 to 1000, and e is an integer of from 2 to 1000.

Typical examples of the silicon-containing compounds of formula (I) are tetramethoxysilane, dimethoxydimethylsilane, diethoxydimethylsilane, tetraethoxysilane, triethoxyethylsilane, diethoxydiethylsilane, ethoxytriethylsilane, tetrapropoxysilane, dipropoxydipropylsilane, tetraisopropoxysilane, diisopropoxydiisopropylsilane, dimethoxydiethylsilane, diethoxydibutylsilane, tetra-n-butoxysilane, di-n-butoxy-di-n-butylsilane, tetra-sec-butoxysilane, tetrahexylsilicate, tetraoctylsilicate, tetraphenoxysilane, tetracresylsilane, trimethoxychlorosilane, dimethoxydichlorosilane, dimethoxydibromosilane, triethoxychlorosilane, diethoxydibromosilane, dibutoxydichlorosilane, dicyclopentoxydiethylsilane, diethoxydiphenylsilane, 3,5-dimethylphenoxytrimethylsilane, methylphenyl-bis(2-chloroethoxy)silane, dimethoxydibenzylsilane, tri-n-propylallyloxysilane, allyltris(2-chloroethoxy)silane and trimethoxy-3-ethoxypropylsilane.

Typical examples of the silicon-containing compounds of general formula (II) are hexamethyldisiloxane, octamethyltrisiloxane, tetracosamethylundecasiloxane, 3-hydroheptamethyltrisiloxane, hexaphenyldisiloxane, hexacyclohexyldisiloxane, 1,3-dimethyldisiloxane, hexaethyldisiloxane, octaethyltrisiloxane, hexapropyldisiloxane, 1,3-dichlorotetramethyldisiloxane, 1,3-bis(p-phenoxyphenyl)-1,3-dimethyl-1,3-diphenyldisiloxane, 1,3-diallytetramethyldisiloxane, 1,3-dibenzyltetramethyldisiloxane, 2,2,4,4-tetraphenyl-2,4-disila-1-oxacyclopentane, 1,1,3,3-tetramethyldisiloxane and hexachlorodisiloxane.

Typical examples of the silicon-containing compounds of general formula (III) are 1,3,5-trimethylcyclotrisiloxane, hexamethylcyclotrisiloxane, octamethylcyclotetrasiloxane, pentamethylchlorocyclotrisiloxane, 1,3,5-trimethyltriphenylcyclotrisiloxane, hexaphenyltriphenylcyclotrisiloxane, 1,3,5-tribenzyltrimethylcyclotrisiloxane and 1,3,5-triallyltrimethylcyclotrisiloxane.

Preferably, in general formula (I), $R^1$ and $R^2$ represent an alkyl radical having at most 8 carbon atoms, a phenyl radical or an aralkyl radical having at most 8 carbon atoms. It is preferred that in general formula (II), $R^3$, $R^4$ and $R^5$ represent an alkyl radical having at most 4 carbon atoms, a phenyl radical or a halogen atom. Desirably, d in formula (II) is not more than 4. It is further preferred that in general formula (III), $R^6$ represent an alkyl radical having at most 4 carbon atoms, a phenyl radical or a vinyl radical. Desirably, e is not more than 10. Specific examples of these preferred silicon-containing compounds are tetramethoxysilane, tetraethoxysilane, tetracresylsilane, hexamethyldisiloxane, diethoxydimethylsilane, and diethoxydiphenylsilane.

(d) Ether compound

Typical examples of the ether-compound which can be used as the electron donor compound, in the present invention are linear or cyclic ether compounds which have at most 30 carbon atoms, and hydrocarbon radicals selected from the group consisting aliphatic hydrocarbon radicals, cycloaliphatic hydrocarbon radicals and aromatic hydrocarbon radicals and derivatives of these hydrocarbon substituted with at most 3 halogen atoms.

Typical examples of the ether compound are linear aliphatic ether compounds such as dimethyl ether, methyl ethyl ether, diethyl ether, di-n-propyl ether, diisopropyl ether, d-n-butyl ether, diisobutyl ether, di-isoamyl ether, dioctyl ether, didodecyl ether, diallyl ether, isobutyl vinyl ether, polyethylene glycol, polypropylene glycol, ethyleneglycol dimethyl ether, diethyl cellosolve, and benzyl methyl ether, linear aromatic ether compounds such as diphenyl ether, di-p-tolyl ether, anisol, ethoxy benzene, dimethoxy benzene and cyclic ether compounds such as ethylene oxide, propylene oxide, trioxane, furan, tetrahydrofuran, dioxane, cumarane and tetrahydropyran.

Among these ether compounds, linear aliphatic ether compounds and linear aromatic ether compounds are preferred. Particularly, ether compounds represented by general formula (IV) are suitable.

$$R^7—O—R^8 \quad (IV)$$

In the general formula, $R^7$ and $R^8$ are the same or different and represent a hydrocarbon radical having at most 10 carbon atoms selected from the group consisting of alkyl radicals, aryl radicals and aralkyl radicals.

(d) Magnesium alcoholate

Examples of the magnesium alcoholate which can be used in the present invention are represented by general formula (V).

$$Mg(OR^9)_2 \quad (V)$$

In formula (V), $R^9$ represents a hydrocarbon radical having at most 8 carbon atoms selected from the group consisting of alkyl radicals, cycloalkyl radicals, aryl radicals and aralkyl radicals. These magnesium alcoholates are obtained by reacting magnesium with lower alcohols (such as methyl alcohol or ethyl alcohol); or by substitution reaction of these magnesium alcoholates with higher alcohols or phenols. Processes for preparing these magnesium alcoholates are well known.

Typical examples of these magnesium alcoholates of formula (V) are magnesium methylate, magnesium ethylate, magnesium n-propylate, magnesium iso-propylate, magnesium butylate, magnesium hexylate, magnesium phenolate, magnesium cyclohexanolate, magnesium benzylalcoholate, and magnesium cresolate.

Those of formula (V) in which $R^9$ is an alkyl group with at most 3 carbon atoms or a phenyl group are especially preferred. Specific examples of these preferred magnesium alcoholates are magnesium ethylate, magnesium methylate and magnesium phenolate.

(e) Ratio of reactants

In the preparation of the solid reaction product (1) in the present invention, the proportion of the aluminum trihalides is generally 0.1 to 10 moles, preferably 0.2 to 5 moles, per mole of the magnesium alcoholate, If the proportion of the aluminum trihalides is less than 0.1 moles per mole of the magnesium alcoholate, the polymerization activity of the resulting catalyst system is low. On the other hand, if it is more than 10 moles, the resulting ethylenic polymer has a bulk density of less than 0.18 g/cc, and therefore, the productivity decreases.

The proportion of the silicon-containing compound and the ether compound is generally 0.1 to 10 moles, preferably 0.2 to 5 moles, per mole of the magnesium alcoholate.

The ratio between the aluminum trihalide and the silicon-containing compound and/or ether compound is an especially important factor. When a reaction product between the aluminum trihalide and the silicon-containing compound and/or ether compound is produced in advance as described hereinbelow, the proportion of the aluminum trihalide is usually 0.25 to 4 moles, preferably 0.5 to 1.5 moles, per mole of the silicon-containing compound and/or ether compound. The use of less than 0.25 mole or more than 4 moles of the aluminum trihalide per mole of the silicon-containing compound and/or ether compound is undesirable since it will cause a reduction in the polymerization activity of the resulting catalyst system or a reduction in the bulk density of the resulting polymer.

(f) Reaction conditions and purification (post-treatment)

There are two methods of producing the solid reaction product (1): method A which comprises reacting the aluminum trihalide, the silicon-containing compound and/or ether compound, and the magnesium alcoholate simultaneously, and method B which comprises first reacting the aluminum trihalide with the silicon-containing compound and/or ether compound, and then reacting the resulting reaction product with the magnesium alcoholate.

The aluminum trihalide, the magnesium alcoholate and the silicon-containing compound and/or ether compound are all hygroscopic, and are susceptible to hydrolysis even by slight moisture. It is essential therefore to react them in an atmosphere of a dry inert gas such as nitrogen or argon. The reaction is carried out in an inert organic solvent which is normally liquid at room temperature. Typical examples of the inert organic solvent include aliphatic hydrocarbons such as n-hexane and n-heptane; alicyclic hydrocarbons such as cyclohexane and methylcyclohexane; aromatic hydrocarbons such as benzene and toluene; and mixtures of these. Those having a boiling point of 50° to 200° C. are desirable.

The amount of the inert organic solvent is generally 3 to 50 mls, preferably 5 to 30 mls, per gram of the magnesium alcoholate. The reaction of the aluminum trihalide with the silicon-containing compound and/or ether compound in the presence of benzene or toluene is an exothermic reaction. From the viewpoint of the removal of the heat of reaction and the solubility of the reaction mixture in the solid reaction product, benzene, toluene and cyclohexane are suitable. Unless the proportion of the silicon-containing compound is within the range of 0.25 to 4.0 moles per mole of the aluminum trihalide, the reaction product would become heterogeneous in the hydrocarbon solvent, and would not react smoothly with the magnesium alcoholate which is a solid.

According to method (A), the aluminum trihalide, the magnesium alcoholate and the silicon-containing compound and/or ether compound are added simultaneously to the organic solvent, and reacted (if desired, under heat).

The reaction temperature for this reaction varies according to the proportions of the aluminum trihalide, the magnesium alcoholate and the silicon-containing compound and/or ether compound, their types, the type of the invert organic solvent, the ratio of the silicon-containing compound and/or the ether compound to the inert organic solvent, and other reaction conditions. Generally, it is from room temperature (about 25° C.) to 150° C.

The reaction time, which varies according to the aforesaid reaction conditions and the reaction temperature, is generally from 10 minutes to 3 hours, preferably 30 to 90 minutes.

When a balance of the reaction temperature and time is considered, the intended product (a complex compound containing aluminum, silicon and/or ether compound, and magnesium) can be suitably obtained by performing the reaction at 50° to 100° C. for 30 minutes to 1.5 hours.

According to method (B), the aluminum trihalide is first reacted with the silicon-containing compound and/or ether compound.

The reaction temperature for this reaction varies according to the ratio between the aluminum trihalide and the silicon-containing compound and/or ether compound, the types of the aluminum trihalide and the silicon-containing compound and/or the ether compound, the type of the inert organic solvent used, the ratio of the silicon-containing compound and/or ether compound to the inert organic solvent, and other reaction conditions. Generally, it is from room temperature (about 25° C.) to 150° C., preferably from room temperature to 100° C. If the reaction temperature is below room temperature, the rate of the reaction is slow. If, on the other hand, the reaction is performed at more than 150° C., the catalyst as a final product tends to give a polymer having a somewhat decreased bulk density. Hence, temperatures outside the specified range are not desirable.

The reaction time, which varies according to the aforesaid reaction conditions and the reaction temperature, is generally at least 10 minutes to achieve the intended object.

When a balance of the reaction temperature and time is considered, the reaction is suitably performed at room temperature (usually, about 25° C.) to 80° C. for 15 minutes to 1 hour.

In the early stage of the reaction, the reaction system is heterogeneous (in the form of suspension), but with the progress of the reaction, the reaction mixture becomes a uniform solution with a changed color.

Reaction of the resulting reaction product with the magnesium alcoholate can afford a solid reaction product in accordance with method (B).

The reaction temperature for this reaction varies according to the reaction conditions such as the ratio between the reaction product and the magnesium alcoholate, the type of the magnesium alcoholate, the conditions for preparing the reaction product in the first step, the type of the inert organic solvent and the ratio of the magnesium alcoholate to the inert organic solvent. Generally, it is from room temperature to 150° C. If the reaction temperature is below room temperature, a complex compound containing aluminum, silicon and/or ether compound, and magnesium (solid reaction product) is formed only insufficiently. On the other hand, if the reaction is performed at more than 150° C., a sidereaction may occur. Hence, temperatures outside the specified range are not desirable.

The reaction time, which varies according to the aforesaid reaction conditions and the reaction temperature, is generally 10 minutes to 8 hours.

In view of a balance of the reaction temperature and the reaction time, the reaction is suitably carried out at 50° to 100° C. for 30 minutes to 1.5 hours.

After the reaction in accordance with method (A) or (B), the supernatant liquid is removed by using a hydrocarbon solvent which is the same as or different from that used in the reaction (this procedure may be taken two or more times). The solid product obtained is washed several times with a hydrocarbon solvent which is the same as or different from that used in the reaction.

In view of the polymerization activity of the resulting catalyst system, method (B) is preferred to method (A) in producing the solid reaction product.

The solid reaction product so purified is a powdery solid which varies in color according to the type of the silicon-containing compound used. Analysis clearly shows that it is a complex compound containing aluminum, silicon and/or ether compound, and magnesium.

The solid catalyst ingredient (A) used in this invention can be prepared by reacting the purified solid reaction product obtained by the methods described hereinabove with the titanium compound to be described below.

(h) Titanium compound

Examples of the titanium compound which can be used in the present invention are represented by general formula (VI).

In formula (VI), $X^1$ represents a chlorine, bromine or iodine atom, $R^{10}$, $R^{11}$, $R^{12}$ and $R^{13}$ are the same or different and represent a hydrocarbon radical having at most 12 carbon atoms selected from the group consisting of alkyl radicals, alkenyl radicals, cycloalkyl radicals, aryl radicals and aralkyl radicals, f is a number of 1 to 4, each of g, h and i is 0 to 3 and $f+g+h+i$ is 4.

Typical examples of the titanium compound are titanium tetrachloride, titanium tetrabromide, titanium tetraiodide, methoxytitanium trichloride, dimethoxytitanium dichloride, trimethoxytitanium chloride, ethoxytitanium trichloride, diethoxytitanium dichloride, triethoxytitanium chloride, propoxytitanium trichloride, butoxytitanium trichloride, dimethylaminotitanium trichloride, bis(dimethyl amino)-titanium dichloride, diethylaminotitanium trichloride, titanium propionate trichloride and titanium benzoate trichloride. Particularly, those titanium compounds of formula (VI) in which h and i are zero, $R^{10}$ is an alkyl radical having at most 6 carbon atoms and f is 3 or 4 (that is, g is 0 or 1) are preferred. For practical application, titanium tetrachloride, ethoxytitanium trichloride, propoxytitanium trichloride and butoxytitanium trichloride are most suitable.

The solid catalyst ingredient used in this invention can be obtained by contacting the aforesaid solid reaction product with the titanium compound. It can also be prepared by contacting the solid product with both the titanium compound and an electron donor compound.

(i) Electron donor compound

The electron donor compound includes, for example, the silicon-containing compounds and ether compounds used in the production of the solid reaction product, and phosphorus-containing organic compounds.

Examples of the phosphorus-containing organic compounds which can be used in the present invention are represented by general formulae (VII) and (VIII).

In formulae (VII) and (VIII), the sum of l, m and n or q, r and s is 3, $0 \leq l$, $m < 3$, $0 < n \leq 3$, $R^{14}$ and $R^{15}$ are the same or different and represent a hydrocarbon radical having at most 20 carbon atoms selected from the group consisting of alkyl radicals, alkenyl radicals, cycloalkyl radicals, cycloalkenyl radicals, aryl radicals an aralkyl radicals and derivatives of hydrocarbon radicals substituted with at most 3 halogen atoms or alkoxy radicals or aryloxy radicals having at most 20 carbon atoms, $X^2$, $X^3$ and Y are the same or different and represent a hydrogen atom, a halogen atom and said hydrocarbon radical or its substituted derivative.

Typical examples of the phosphorus-containing organic compounds of formula (VII) are ethyl diethylphosphinite, ethyl butylethylphosphinite, ethyl phenylmethylphosphinite, ethyl phenylvinylphosphinite, phenyl dibenzylphosphinite, dimethyl methylphosphonite, diphenyl methylphosphonite, diethyl benzylphosphonite, diphenyl ethylphosphonite, dibutyl benzylphosphonite, diethyl 2-chloroethylphosphonite, trimethyl phosphite, triethyl phosphite, tri-n-propyl phosphite, triisopropyl phosphite, triallyl phosphite, tri-n-butyl phosphite, triphenyl phosphite, tricyclohexyl phosphite, tribenzyl phosphite, tris(3-ethoxypropyl) phosphite, tris(2-chloroethyl) phosphite, tricresyl phosphite, diphenylnonyl phosphite, tris(nonylphenyl) phosphite, diphenylisodecyl phosphite, triisodecyl phosphite, tris(2-ethylhexyl) phosphite, ethyl ethylphosphonochloridite, phenyl ethyl phosphonochloridite, phenyl phenylphosphonochloride, n-butyl phenyl phosphonochloridite, ethyl ethylphosphonochloride diethyl chlorophosphite, diphenyl chlorophosphite, dioctylchlorophosphite, diethyl bromophosphite, dibenzyl chlorophosphite, benzyl dichlorophosphite, 2-chloroethyl dichlorophosphite and hexyl dichlorophosphite.

Typical examples of the phosphorus-containing organic compound of formula (VIII) are methyl dimethylphosphinate, ethyl diethylphosphinate, ethyl dipropylphosphinate, ethyl di-n-butylphosphinate, ethyl diphenylphosphinate, methyl dicyclohexylphosphinate, 2-chloroethyl dibenzylphosphinate, ethyl ethylphosphonochloridate, phenyl ethylphosphonochloridate, phenyl phenylphosphonochloridate, n-butyl phenylphosphonochloridate, ethyl ethylphosphonobromidate, diethyl methylphosphonate, diphenyl phenylphosphonate, dioctyl butylphosphonate, diethyl phenylphosphonate, diallyl phenylphosphonate, bis(2-chloroethyl) phenylphosphonate, diethyl cyclohexylphosphonate, diethyl benzylphosphonate, diethyl phosphorochloridate, di-n-butyl phosphorochloridate, dioctyl phosphorochloridate, diphenyl phosphorochloridate, dibenzyl phosphorochloridate, dicresyl phosphorochloridate, bis(2-chloroethyl) phosphorochloridate, diphenyl phosphorobromidate, ethyl phosphorodichloridate, n-butyl phosphorodichloridate, phenyl phosphorochloridate, benzyl phosphorodichloridate, cresyl phosphorodichloridate, ethylphosphorodibromidate, triethyl phosphate, tri-n-butyl phosphate, triphenyl phosphate, tribenzyl phosphate, trihexyl phosphate, diethylphosphate, di-n-butyl phosphate, diphenyl phosphate, cresyl diphenyl phosphate, tricresyl phosphate, tritolyl phosphate, trixylyl phosphate, diphenyl.mono-o-phosphate, diphenyl phosphate, tris(bromochloropropyl) phosphate, triethylphosphine oxide, tri-n-butylphosphine oxide, triphenylphosphine oxide, diphenylphosphinic chloride, ethylphenylphosphinic chloride, diphenylphosphinic bromide, methylphenylphosphinic bromide, dibutylphosphinic chloride, dimethylphosphinic chloride, ethylphosphonic dichloride, propylphosphonic dichloride, butylphosphonic dichloride, phenylphosphonic dichloride, phenylphosphonic dibromide, triphosphonic dichloride and benzylphosphonic dichloride.

Of these phosphorus-containing organic compounds, those of formula (VII) in which $R^{14}$ is a hydrocarbon radical containing at most 8 carbon atoms, especially at least 2 carbon atoms, are preferred. Examples of suitable organic electron donor compounds of formula (VII) are triethyl phosphite, triphenyl phosphite, diphenylethyl phosphonite, diethyl phosphonite, diethylbutyl phosphonite, dibutylchlorophosphite and diphenyl chlorophosphite.

In formula (VIII), $R^{15}$ is preferably a hydrocarbon radical containing at most 8 carbon atoms. Examples of preferred phosphorus-containing compounds of formula (VIII) are triphenylphosphine oxide, tributylphosphine oxide, ethyl diphenylphosphinate, diphenyl methylphosphonate, phenyl phosphorodichloridate, phenylphosphonic dichloridate, propylphosphonic dichloride, triphenyl phosphate, and tributyl phosphate.

(j) Proportions of reactants

The ratio between the solid reaction product containing aluminum, silicon and/or ether compound, and magnesium, and the titanium compound varies according to the magnesium content of the solid reaction product. Generally, the amount of the titanium compound is the minimum amount required for supporting the titanium compound on the solid reaction product. The proportion of the titanium compound is usually 0.1 to 200 moles, preferably 0.2 to 100 moles, per magnesium atom in the solid reaction product. The proportion can also change according to the reaction temperature, the concentration of reactants, and the reaction time. Suitable conditions are selected such that the amount of titanium atom deposited on the solid reaction product (complex) containing aluminum, silicon and/or ether compound, and magnesium is generally 1 to 10% by weight.

The ratio of the electron donor compound to the titanium compound is not particularly limited. Generally, the proportion of the former is 0.05 to 5 moles per mole of the latter. From the viewpoint of the bulk density of the polymer to be produced, and the controlling of the distribution of its molecular weight or its particle size, the proportion of the organic electron donor is preferably 0.1 to 2 moles.

(k) Reaction conditions and purification (post-treatment)

The solid catalyst ingredient can be produced by reacting the solid reaction product with the titanium compound in the presence or absence of the same inert organic solvent as used in producing the solid reaction product.

The reaction temperature for this reaction varies according to the reaction conditions such as the ratio of the titanium compound to magnesium in the solid reaction product and the types of the solid reaction product and the titanium compound. Generally, it is from room temperature to 150° C., preferably 50° to 140° C. If the temperature is below room temperature, the reaction is insufficient. When the reaction is performed at more than 150° C., the desired product can be obtained. However, there is no need to use such a high reaction temperature. On the other hand, the reaction in the absence of solvent is desirably carried out at a higher temperature than in the presence of a solvent. The preferred reaction temperature is 80° to 140° C.

The reaction time varies according to the reaction conditions mentioned above, and the reaction temperature. It is generally 10 minutes to 3 hours. Usually, from the standpoint of the activity of the resulting catalyst system, the reaction time is desirably from 30 minutes to 2 hours. If the reaction time is less than 10 minutes, the reaction is insufficient. Even when the reaction is carried out for more than 3 hours, the reaction does not proceed further, and rather the resulting catalyst may sometimes be deactivated.

From an overall consideration of the reaction temperature and time, it is preferred to perform the reaction at a temperature of 50° to 140° C. for 10 minutes to 2 hours.

The solid catalyst ingredient obtained by the aforesaid method is purified generally by the following procedures.

The supernatant liquid is removed from the reaction mixture consisting of the solid catalyst ingredient and the unreacted compounds by decantation or filtration using a hydrocarbon solvent which is the same as or different from that used in the reaction, and the residue is washed with the hydrocarbon solvent until there is no substantial presence of the titanium compound in the washing liquid. Or the resulting slurry containing the solid catalyst ingredient (substantially free from the unreacted titanium compound) may be fed to a polymerization reactor to be described hereinbelow. Or the hydrocarbon solvent used for washing is removed under reduced pressure, and the resulting solid catalyst ingredient is fed to the polymerization reactor.

(l) Organoaluminum compound

Examples of the organoaluminum compounds which can be used in the present invention are represented by general formulae (IX), (X) and (XI).

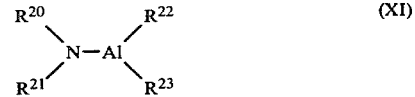

In the general formulae, $R^{16}$, $R^{17}$ and $R^{18}$, and $R^{20}$, $R^{21}$, $R^{22}$ and $R^{23}$ are the same or different, $R^{16}$, $R^{17}$ and $R^{18}$ represent a hydrogen atom, a halogen atom or an alkyl radical or alkoxy radical having at most 8 carbon atoms, $R^{19}$ represents an alkyl radical having at most 8 carbon atoms, $R^{20}$, $R^{21}$ and $R^{22}$ represents an alkyl radical having at most 8 carbon atoms, $R^{23}$ represents a halogen atom or an alkyl radical having at most 8 carbon atoms and $X^3$ represents a halogen atom, with the proviso that at least one of $R^{16}$, $R^{17}$ and $R^{18}$ is an alkyl radical. In formula (X), the sum of x and y is 3.

Typical examples of these organoaluminum compounds are trialkylaluminum compounds such as triethylaluminum, triisobutylaluminum and trihexylaluminum, alkylaluminum halide compounds such as diethylaluminum chloride, ethylaluminum sesquichloride and dibutylaluminum chloride, dialkylaluminum hydride compounds such as diethylaluminum hydride, alkylaluminum alkoxide compounds such as diethylaluminum ethoxide and dibutylaluminum methoxide and alkylaluminum amide compounds such as diethylaluminum diethylamide. Among these organoaluminum compounds, the trialkylaluminum compounds are preferred. Particularly, trialkylaluminum compounds which have alkyl radicals having at most 6 carbon atoms (e.g., triethylaluminum, triisobutylaluminum) are suitable.

In the production of the catalyst system used in this invention, the aluminum trihalides, silicon-containing compounds and/or ether compounds, and magnesium alcoholates used to produce the solid reaction product, and the solid reaction products and the titanium compounds used to produce the solid catalyst ingredient, and the organoaluminum compounds can each be used singly or as a mixture of two or more.

(m) Polymerization

In performing the process of this invention, the solid catalyst ingredient and the organoaluminum compound may be introduced separately into a polymerization reactor, or mixed in advance. Or they may be used as diluted with an inert organic solvent such as a hydrocarbon.

(i) Amounts of the solid catalyst ingredient and the organoaluminum compound:

There is no particular limit to the amounts of the solid catalyst ingredient and the organoaluminum compound used in performing the process of this invention. Preferably, however, 1 mg to 1 g of the solid catalyst ingredient and 0.1 to 10 millimole of the organoaluminum compound are used per liter of the inert organic solvent used in the polymerization. The amount of the organoaluminum compound is generally 1 to 1,000 moles per atom equivalent of titanium metal contained in the solid catalyst ingredient.

(ii) Comonomer

An ethylene homopolymer or an ethylene copolymer can be obtained by contacting ethylene alone or a monomeric mixture of ethylene and a hydrocarbon having a terminal double bond (comonomer) with a catalyst system obtained from the aforesaid solid catalyst ingredient and organoaluminum compound.

The comonomer has at most 12 carbon atoms, and is typified by propylene, butene-1, pentene-1, 4-methylpentene-1, hexene-1, octene-1, and decene-1. The proportin of the comonomer in the resulting ethylene copolymer is at most 30 mole %, preferably not more than 20 mole %, especially preferably not more than 10 mole %.

(iii) Other polymerization conditions

The polymerization is performed while dissolving ehtylene or both ethylene and an olefin in an inert solvent. If desired, a molecular weight regulator (generally, hydrogen) may be present together.

Examples of suitable inert organic solvents include aliphatic or alicyclic hydrocarbons such as butane, pentane, hexane, heptane, cyclohexane, methylcyclohexane and mixtures of these.

The polymerization temperature is generally from −10° C. to 200° C., and for practical purposes, it is from room temperature to 170° C.

The polymerization pressure is generally from atmospheric pressure to 100 atms., preferably 10 to 60 atms. Of course, the polymerization pressure is a function of the polymerization temperature employed.

The polymerization reactor used for the production of polyolefin using the catalyst of this invention can be any of tower-type, vessel-type and tube-type reactors, and 2 or more of these reactors can be employed in series or in parallel.

The catalyst residue-containing polymer powder thus obtained is purified or inactivated by known methods (such as, for example, washing with a liquid monomer, hydrocarbon, alcohol or $H_2O$) and then put to commercial use. The polymer can also be put to commercial use without any purification or after simple inactivation using steam and/or alcohol vapor.

The aftertreatment or other polymerization conditions which are employed in this invention are not limited, and can be performed by known methods.

The following examples illustrate the present invention in more detail.

In the following examples, polymerization specific rate is obtained polymer yield (g) per g of solid catalyst ingredient per an hour per partial pressure (atm) of ethylene as a monomer, the melt index (abbreviated M. I.) was measured by the method of ASTM.D-1238-65T. The density was measured by the method of ASTM.D-1505-68T. The soluble portion is the percentage of the content of a soluble part of a polymer extracted for 6 hours with boiling cyclohexane.

The short-chain branches are determined by the method of Willbourn from the absorption of a methyl group at 1378 cm$^{-1}$ by using the absorption at 4255 cm$^{-1}$, determined by an infrared absorption spectral method, as an internal standard (see A. H. Willbourn, *Journal of Polymer Science*, Vol. 34, page 569, 1969).

The compounds used in preparing the solid catalyst ingredients and in polymerization in the following Examples and Comparative Examples (e.g., organic solvents, ethylene, other olefins, hydrogen, titanium compounds, organoaluminum compounds, aluminum trihalides, silicon-containing organic compounds, ether compounds) were substantially free of water. The preparation of the solid catalyst ingredients and the polymerization were carried out in a nitrogen atmosphere substantially free of oxygen.

EXAMPLE 1 AND COMPARATIVE EXAMPLES 1 to 3

(A) Preparation of a solid catalyst ingredient

Benzene (30 ml) was placed into a 200 ml three-necked flask, and reacted with anhydrous aluminum chloride and tetraethyl silicate in the amounts shown in Table 1-1 with stirring. The reaction was continued at room temperature (25° C.) for 30 minutes. Then, magnesium ethylate was weighed as shown in Table 1-1 and added to the reaction product. The temperature was raised to 75° C., and the reaction was performed at this temperature for 1.5 hours with stirring. The flask was cooled to below 40° C. to sediment the solid reaction product. The supernatant liquid was withdrawn by a syringe. Fresh n-hexane (30 ml) was added, and the solid product was washed with stirring. Then, the supernatant liquid was removed. By this decantation, the solid reaction product was washed three times. Further, 8 ml of titanium tetrachloride was added, and the temperature was raised to 90° C. The reaction was performed at this temperature for 1.5 hours with stirring. After the reaction, the reaction mixture was cooled to 40° C., and the supernatant liquid was removed. The solid catalyst ingredient was washed four times with 30 ml of n-hexane and decantation method. The solid catalyst ingredient obtained was dried at 50° C. under reduced pressure. The amount of the solid catalyst ingredient yielded in each of the examples is shown in Table 1-1.

Comparative Examples 1 and 2 were performed by the same procedures as in Example 1 except that tetraethyl silicate (Comparative Example 1) and aluminum chloride (Comparative Example 2) were omitted. Comparative Example 3 was different in that magnesium ethylate was reacted directly with titanium tetrachloride, but the washing procedure after the reaction was the same as in Example 1.

Ti atom in the solid catalyst ingredient was determined by atomic absorption analysis, and Cl, by a titration method. (B) Polymerization of ethylene A thoroughly pre-dried 1.2-liter autoclave was charged with 1.4 ml of a 0.5 M n-heptane solution of triisobutyl aluminum, and the solid catalyst ingredient prepared as set forth in (A) was added in each of the amounts indicated in Table 1-2. Then, 346 g of isobutane was added as a solvent, and the autoclave was closed. The temperature was raised to 85° C. while stirring the contents of the autoclave by an anchor-type stirrer at 175 rpm. When the temperature reached 85° C., hydrogen gas was introduced so that the partial pressure of hydrogen reached 2 kg/cm²G and subsequently, ethylene was introduced so that its partial pressure reached 10 kg/cm²G. Ethylene was continuously fed into the autoclave so as to maintain the system pressure at 26 kg/cm²G. In this way, ethylene was polymerized for a given time. Then, the unreacted monomer, hydrogen and solvent were purged through a relief line. The resulting polymer was dried in vacuo for 2 hours at 80° C. to afford polyethylene as a white powder. The properties of the polymer are shown in Table 1-2.

The results show that the catalyst in Example 1 had higher activity and better productivity than those used in Comparative Examples, and the bulk density of the polymer in Example 1 was higher than those of the polymers obtained in the Comparative Examples.

TABLE 1-1

| | AlCl$_3$ (m mol) | Si(OC$_2$H$_5$)$_4$ (m mol) | Mg(OC$_2$H$_5$)$_2$ (m mol) | Benzene (ml) | TiCl$_4$ (ml) | Solid catalyst ingredient (g) | Ti[1] | Cl[1] | Designation of solid catalyst ingredient |
|---|---|---|---|---|---|---|---|---|---|
| Example 1 | 35.0 | 35.0 | 17.5 | 30 | 8 | 2.70 | 4.3 | 55 | A |
| Comparative Example 1 | 35.0 | 0 | 17.5 | 30 | 8 | 1.51 | 4.5 | 60 | B |
| Example 2 | 0 | 35.0 | 17.5 | 30 | 8 | 2.10 | 3.7 | 53 | C |
| Example 3 | 0 | 0 | 17.5 | — | 8 | 3.36 | 5.1 | 55 | D |

[1]weight %

TABLE 1-2

| | Solid catalyst ingredient (mg) | Polymerization time (min) | Polymer Yield (g) | Specific Rate (g/g hr. atm.) | Bulk density (g/cm$^3$) | MI | HLMI | Density (g/cm$^3$) |
|---|---|---|---|---|---|---|---|---|
| Example 1 | (A) 15.3 | 45 | 220.3 | 1920 | 0.28 | 0.52 | 18.8 | 0.9526 |
| Comparative Example 1 | (B) 16.9 | 60 | 215.5 | 1275 | 0.26 | 0.43 | 12.9 | 0.9523 |
| Example 2 | (C) 17.3 | 60 | 36.8 | 213 | 0.197 | 8.11 | 0.9524 | |
| Example 3 | (D) 14.5 | 60 | 232.0 | 1600 | 0.23 | 0.56 | 17.3 | 0.9540 |

EXAMPLES 2 TO 9

By the same method as in Example 1, solid catalyst ingredients were prepared by using various silicon-containing organic compounds in the amounts shown in Table 2-1. Using the resulting catalyst ingredients, ethylene was polymerized at 85° C. while maintaining the partial pressure of hydrogen and ethylene at 2 and 10 kg/cm²G, respectively. The properties of the polymers obtained are shown in Table 2-2.

TABLE 2-1

| Example No. | AlCl$_3$ (m mol) | Si-O Compound kind | m mol | Mg(OC$_2$H$_5$)$_2$ m mol | Toluene (ml) | TiCl$_4$ (ml) | Designation of solid catalyst ingredient |
|---|---|---|---|---|---|---|---|
| 2 | 35.0 | (CH$_3$)$_2$Si(OC$_2$H$_5$)$_2$ | 35.0 | 17.5 | 34 | 9.0 | (E) |
| 3 | 35.0 | (CH$_3$)$_2$Si(OCH$_3$)$_2$ | 35.0 | 17.5 | 34 | 9.0 | (F) |
| 4 | 35.0 | (C$_6$H$_5$)$_2$Si(OCH$_3$)$_2$ | 17.5 | 17.5 | 34 | 9.0 | (G) |
| 5 | 35.0 | (C$_6$H$_5$)$_2$Si(OC$_2$H$_5$)$_2$ | 24.5 | 17.5 | 34 | 9.0 | (H) |
| 6 | 35.0 | Si(OCH$_3$)$_4$ | 35.0 | 17.5 | 34 | 9.0 | (I) |
| 7 | 35.0 | HMDS[a] | 35.0 | 17.5 | 34 | 9.0 | (J) |
| 8 | 35.0 | OMTS[b] | 35.0 | 17.5 | 34 | 9.0 | (K) |
| 9 | 35.0 | Si(OC$_6$H$_4$CH$_3$)$_4$ | 35.0 | 17.5 | 40 | 9.0 | (L) |

[a]Hexamethyldisiloxane (HMDS)
[b]Octamethyltrisiloxane (OMTS)

TABLE 2-2*

| Example No. | Solid Catalyst Ingredient Kind | mg | Polymerization Time (min) | Yield (g) | Specific Rate (a) | Bulk density | MI | HLMI/MI | Density (g/cm$^3$) | Cyclohexane-soluble content (%) |
|---|---|---|---|---|---|---|---|---|---|---|
| 2 | E | 13.1 | 60 | 268.5 | 2050 | 0.29 | 0.40 | 31.8 | 0.9536 | 0.30 |
| 3 | F | 15.2 | 45 | 205.2 | 1800 | 0.30 | 1.58 | 32.1 | 0.9572 | 0.45 |
| 4 | G | 14.6 | 30 | 189.4 | 2595 | 0.29 | 1.47 | 32.1 | 0.9560 | 0.43 |
| 5 | H | 17.1 | 30 | 208.1 | 2434 | 0.28 | 0.98 | 32.2 | 0.9550 | 0.37 |
| 6 | I | 18.6 | 30 | 183.2 | 1970 | 0.31 | 0.38 | 26.5 | 0.9584 | 0.28 |
| 7 | J | 16.7 | 30 | 219.3 | 2626 | 0.29 | 0.26 | 32.0 | 0.9524 | 0.22 |

TABLE 2-2*-continued

| Example No. | Solid Catalyst Ingredient Kind | Solid Catalyst Ingredient mg | Polymerization Time (min) | Yield (g) | Specific Rate (a) | Bulk density | MI | HLMI/MI | Density (g/cm³) | Cyclohexane-soluble content (%) |
|---|---|---|---|---|---|---|---|---|---|---|
| 8 | K | 18.3 | 30 | 161.7 | 1767 | 0.30 | 0.65 | 31.8 | 0.9548 | 0.37 |
| 9 | L | 17.2 | 30 | 201.5 | 2343 | 0.32 | 0.41 | 30.8 | 0.9537 | 0.30 |

*85° C. Partial Pressure of hydrogen/Partial Pressure of ethylene = 2/10 (atm/atm)
(a) g(polymer)/g(solid catalyst ingredient) . hr . atm(ethylene partial pressure)

EXAMPLES 10 to 13

(A) Preparation of a solid catalyst ingredient

Solid catalyst ingredients were prepared in the same way as in Example 1 except that the solvent was changed to toluene, and tetraethyl silicate was changed to each of the ethers shown in Table 3-1. The conditions and the results are also shown in Table 3-1.

(B) Polymerization of ethylene

Ethylene was polymerized in the same way as in Example 1 except as indicated in Table 3-2. The results are shown in Table 3-2.

Aluminum chloride, each of the two silicon-containing organic compounds and each of the two magnesium alcoholates in the amounts shown in Table 4-1 were reacted at 75° C. for 1.5 hours in 30 mls of benzene as a solvent. The solid reaction product was reacted with each of the titanium compounds in the amounts shown in Table 4-1. Other conditions were the same as in Example 1.

(B) Polymerization of ethylene

Using each of the solid catalyst ingredients in the amounts shown in Table 4-1 and each of the organoaluminum compounds in the amount shown in Table 4-2,

TABLE 3-1

| Example No. | Designation of solid catalyst ingredient | Aluminum chloride (g) | Ether kind | Ether g | Toluene (ml) | Mg(OC₂H₅)₂ (g) | Complexed carrier (g) | TiCl₄ (ml) | Yield of solid catalyst ingredient (g) | Analysis (%) Ti | Al | Cl |
|---|---|---|---|---|---|---|---|---|---|---|---|---|
| 10 | M | 4.75 | Isoamyl ether | 5.65 | 35 | 2.01 | 1.95 | 8.83 | 1.95 | 4.3 | 2.5 | 55 |
| 11 | N | 4.96 | Diphenyl ether | 6.51 | 36 | 2.13 | 2.04 | 9.24 | 2.26 | 4.1 | 2.3 | 60 |
| 12 | O | 4.95 | Diethyl ether | 2.82 | 36 | 2.12 | 2.62 | 11.9 | 1.93 | 3.5 | 4.5 | 57 |
| 13 | P | 6.41 | Anisole | 5.23 | 46 | 2.75 | 2.61 | 11.8 | 2.32 | 3.9 | 4.0 | 50 |

TABLE 3-2

| Example No. | Designation of solid catalyst ingredient | Solid catalyst ingredient (mg) | Polymerization temperature (°C.) | Time (min) | Yield (g) | Specific rate (g/g hr. atm) | Bulk density (g/cm³) | MI | HLMI | Density |
|---|---|---|---|---|---|---|---|---|---|---|
| 10 | M | 21.0 | 85 | 40 | 243.7 | 1739 | 0.29 | 0.55 | 17.8 | 0.9535 |
| 11 | N | 18.8 | 85 | 40 | 265.4 | 2118 | 0.29 | 0.683 | 22.8 | 0.9547 |
| 12 | O | 15.5 | 85 | 40 | 161 | 1556 | 0.285 | 0.23 | 8.26 | 0.9512 |
| 13 | P | 14.9 | 90 | 45 | 146.0 | 1807 | 0.27 | 0.37 | 11.2 | 0.9520 |

EXAMPLES 14 to 18

(A) Preparation of a solid catalyst ingredient ethylene was polymerized at 85° C. under the conditions shown in Table 4-2 while maintaining the partial pressures of hydrogen and ethylene at 2 and 10 kg/cm²G, respectively.

TABLE 4-1

| Example No. | Amount of AlCl₃ (m mol) | Si—O Compound kind | Si—O Compound Amount (m mol) | Magnesium Alcoholate kind | Magnesium Alcoholate (m mol) | Titanium Compound kind | Titanium Compound m mol | Ti-atom Content (wt. %) |
|---|---|---|---|---|---|---|---|---|
| 14 | 25.0 | Hexamethyl disiloxane | 24.5 | Mg(OC₆H₅)₂ | 12.3 | TiCl₄ | 64 | 2.7 |
| 15 | 28.9 | Hexamethyl disiloxane | 29.8 | Mg(OC₂H₅)₂ | 14.6 | Ti(OC₄H₉)Cl₃ | 60 | 2.3 |
| 16 | 16.3 | Tetra Cresyl Silane | 17.1 | " | 8.14 | TiCl₄ | 64 | 2.3 |
| 17 | 32.8 | Tetra Cresyl Silane | 35.5 | " | 17.0 | " | " | 2.8 |
| 18 | 32.8 | Tetra Cresyl Silane | 35.5 | " | 17.0 | " | " | 2.8 |

TABLE 4-2

| Example No. | Amount of solid catalyst ingredient (mg) | Organo aluminum Compound kind | Organo aluminum Compound Amount (m mol) | Time (min) | Polymerization Yield (g) | Specific Rate | Bulk Density | MI |
|---|---|---|---|---|---|---|---|---|
| 14 | 13.5 | Al(i-C₄H₉)₃ | 0.7 | 60 | 312 | 2315 | 0.32 | 0.17 |

TABLE 4-2-continued

| Example No. | Amount of solid catalyst ingredient (mg) | Organo aluminum Compound kind | Amount (m mol) | Time (min) | Polymerization Yield (g) | Specific Rate | Bulk Density | MI |
|---|---|---|---|---|---|---|---|---|
| 15 | 16.1 | " | 0.7 | 45 | 288.5 | 2390 | 0.295 | 0.08 |
| 16 | 12.7 | " | 0.7 | 60 | 208.6 | 1788 | 0.30 | 0.28 |
| 17 | 23.8 | Al(C$_2$H$_5$)$_3$ | 0.7 | 40 | 293.2 | 1888 | 0.297 | 0.63 |
| 18 | 10.1 | " | 0.7 | 120 | 326.4 | 1616 | 0.32 | 0.51 |

EXAMPLES 19 to 26 and Comparative Examples 4 to 7

Using each of the solid catalyst ingredients prepared in Examples 2 to 9 and Comparative Examples 1 and 3, and 0.7 millimole of triisobutyl aluminum in the same way as in Example 1, ethylene and butene-1 were copolymerized under the polymerization conditions shown in Table 5 at various ratios of the partial pressure of hydrogen/the partial pressure of ethylene. At a given weight ratio between butene-1 and ethylene, butene-1 was introduced in two portions during the polymerization by the air of ethylene gas introduced under pressure. The polymerization reaction product was post-treated in the same way as in Example 1.

It is seen from Table 5 that copolymers having a very high to a very low molecular weight can be obtained with high activity. It is noted that under the same copolymerization conditions, the Examples give powdery copolymers of higher MI and higher bulk density than the Comparative Examples, and the performance of copolymerization was also superior. FIG. 1 shows plots of the specific rate of copolymerization versus the melt index of copolymer.

2.88 g of (17.0 millimoles) of diphenyl ether were added slowly at room temperature. They were reacted with stirring for about 30 minutes until an exothermic reaction subsided, and then 1.94 g (17.0 millimoles) of magnesium ethylate was added. The temperature of the contents was raised to 90° C. The reaction was performed at this temperature for 90 minutes. The reaction mixture was cooled to room temperature. The supernatant liquid was removed, and the residue was washed three times with 24.3 ml of fresh n-hexane. The resulting solid product was reacted with 8.79 ml of titanium tetrachloride at 90° C. for 90 min. The resulting solid catalyst ingredient was washed four times with 29 ml of n-hexane. By atomic absorption analysis, the solid catalyst ingredient obtained was found to contain 4.9% by weight of titanium atom, 2.5% by weight of aluminum atom, 1.7% by weight of silicon atom and 14.0% by weight of magnesium atom. By a titration method, it was found to contain 55% by weight of Cl.

(B) Polymerization of ethylene

Ethylene was polymerized at 85° C. for 40 minutes by using 18.2 mg of the solid catalyst ingredient prepared as set forth in (A) above and 0.7 millimole of triisobutyl aluminum while maintaining the partial pressures of

TABLE 5

| Example No. | Solid catalyst ingredient kind | Amount (mg) | Polymerization temperature (°C.) | P$_{H2}$/P$_{C2}$* (atm/atm) | F$_{C4}$/F$_{C2}$** (wt. %) | Polymerization Time (min) | Yield (g) | Specific Rate | Bulk Density | HLMI | MI | Density (g/cm$^3$) | Ethyl Brancher |
|---|---|---|---|---|---|---|---|---|---|---|---|---|---|
| 19 | (E) | 14.3 | 85 | 0.23/5 | 2.65 | 45 | 238.6 | 4450 | 0.32 | 1.75 | 0.056 | 0.9271 | 6.5 |
| 20 | (H) | 15.6 | 85 | 0.23/5 | 2.73 | 50 | 241.7 | 3841 | 0.29 | 1.56 | 0.050 | 0.9273 | 6.3 |
| 21 | (J) | 16.7 | 85 | 0.23/5 | 3.25 | 45 | 221.1 | 3530 | 0.28 | 0.99 | 0.030 | 0.9258 | 7.3 |
| 22 | (L) | 15.9 | 85 | 0.23/5 | 3.51 | 45 | 237.6 | 3985 | 0.33 | 1.11 | 0.036 | 0.9265 | 6.3 |
| 23 | (E) | 18.5 | 90 | ⅜ | 2.46 | 45 | 216.5 | 1950 | 0.28 | — | 10.2 | 0.9485 | 3.1 |
| 24 | (E) | 25.3 | 90 | 12/8 | 1.87 | 60 | 247.0 | 1220 | 0.26 | — | 285 | 0.9612 | 2.8 |
| 25 | (H) | 19.4 | 90 | ⅜ | 2.35 | 30 | 204.2 | 2630 | 0.27 | — | 10.5 | 0.9490 | 3.2 |
| 26 | (H) | 26.7 | 90 | 12/8 | 2.02 | 40 | 235.9 | 1656 | 0.26 | — | 402 | 0.9604 | 2.5 |
| Comparative Example 4 | (B) | 22.5 | 85 | 0.23/5 | 3.67 | 60 | 191.3 | 1739 | 0.23 | 0.32 | — | 0.9256 | 4.3 |
| Comparative Example 5 | (B) | 27.6 | 90 | 12/8 | 3.50 | 60 | 156.3 | 708 | 0.26 | — | 175 | 0.9642 | 1.8 |
| Comparative Example 6 | (D) | 17.5 | 85 | 0.23/5 | 3.55 | 45 | 198.0 | 3014 | 0.20 | 1.33 | — | 0.9271 | 5.6 |
| Comparative Example 7 | (D) | 27.3 | 90 | 12/8 | 2.53 | 60 | 126.5 | 579 | 0.187 | — | 85 | 0.9622 | 2.1 |

*Partial Pressure of hydrogen/Partial Pressure of ethylene.
**Given weight ratio of butene-1/ethylene.

EXAMPLE 27

(A) Preparation of a solid catalyst ingredient

A 200 ml three-necked flask was charged with 4.53 g (34 millimoles) of anhydrous aluminum chloride, and 33 mls of toluene was added as a solvent. With stirring, 2.52 g (17.0 millimoles) of dimethyldiethoxy silane and hydrogen and ethylene at 2 and 10 kg/cm$^2$G, respectively. Otherwise, the conditions were the same as in Example 1. The amount of the polymer yielded was 337.9 g, and the specific rate of polymerization was as high as 2,785 g/g hr.atm. The powdery polymer had a bulk density of 0.285 g/cm$^3$ and a melt index of 0.67 g/10 min. The content of a cyclohexane-soluble portion was as small as 0.35%.

(C) Copolymerization of ethylene with hexene-1.

Using 15.6 mg of the catalyst ingredient prepared as set forth in (A) above and 0.7 millimole of triisobutyl aluminum, ethylene was copolymerized with hexene-1. In accordance with Example 1, 30 g of hexene-1 and 346 g of isobutane as a solvent were charged, and the copolymerization was performed at 85° C. for 45 minutes while maintaining the partial pressures of hydrogen and ethylene at 0.3 and 5 kg/cm$^2$G, respectively. There was obtained 193 g of a copolymer as a white powder. The specific rate of copolymerization was 3,300 g/g.hr.atm. The powder had a bulk density of 0.29 g/cm$^3$, M.I. of 0.072 g/10 min. and HLMI of 4.38 g/10 min. The HLMI/MI ratio was as high as 60.8, and the processability of the copolymer shows improvement. The number of butyl branches was 10.1/1000 carbons. The density of the copolymer was 0.9316 g/cm$^3$.

EXAMPLES 28 to 32

(A) Preparation of a solid catalyst ingredient

A 500 ml three-necked flask was charged with 13.33 g (100 millimoles) of granular aluminum chloride with a size of 2 to 16 mesh and 71.4 ml of toluene, and then 19.07 g (70 millimoles) of diphenyldiethoxy silane was added. The contents were heated to 50° C., and with stirring, the reaction was performed for 30 minutes. A yellowish uniform viscous solution formed. Furthermore, 11.43 g (100 millimoles) of magnesium ethylate was added. The temperature was raised to 75° C., and the reaction was performed for about 1.5 hours. The solid product obtained was washed three times with 143 ml of fresh n-hexane in the same way as in Example 1, (A). The solid was dried in vacuo at 50° C. to afford 12.8 g of a pale cream-colored solid reaction product.

The resulting product (complexed carrier) was divided and put into five flasks in the amounts shown in Table 6-1 in an atmosphere of nitrogen. Predetermined amounts of methylcyclohexane (solvent), titanium tetrachloride and each of the electron donors were added to the carrier. The temperature was raised to 90° C., and the reaction was performed for 1.5 hours. After the reaction, the solid catalyst ingredient obtained was washed four times with 30 ml of n-hexane.

(B) Polymerization of ethylene

Using each of the solid catalyst ingredients obtained as set forth in (A) above, ethylene was polymerized in the same way as in Example 1. The results are shown in Table 6-2. The activities of the catalysts and the bulk densities of the resulting polymers were especially high.

TABLE 6-1

| Ex. No. | Complexed Carrier (g) | Solvent$^a$ (ml) | TiCl$_4$ (ml) | Donor | Donor/TiCl$_4$ (mol. ratio) | Name |
|---|---|---|---|---|---|---|
| 28 | 2.25 | 5.62 | 4.5 | 0 | 0 | Q |
| 29 | 2.51 | 6.28 | 5.0 | Anisole | 0.20 | R |
| 30 | 2.36 | 5.90 | 4.7 | " | 0.50 | S |
| 31 | 2.02 | 5.05 | 4.0 | Triphenyl Phosphite | 0.10 | T |
| 32 | 2.15 | 5.38 | 4.3 | Tetracresyl silane | 0.25 | U |

$^a$Methylcyclohexane

TABLE 6-2*

| Ex. No. | Solid Catalyst ingredient Name | mg | Polymerization time (min) | Specific Rate | Bulk density (g/cm$^3$) | MI | density (g/cm$^3$) | HLMI/MI |
|---|---|---|---|---|---|---|---|---|
| 28 | Q | 18.0 | 60 | 1624 | 0.30 | 2.32 | 0.9572 | 31.0 |
| 29 | R | 14.5 | 45 | 2433 | 0.33 | 1.49 | 0.9560 | 30.0 |
| 30 | S | 12.7 | 40 | 2909 | 0.33 | 1.14 | 0.9559 | 30.3 |
| 31 | T | 15.8 | 60 | 1950 | 0.35 | 2.96 | 0.9579 | 31.5 |
| 32 | U | 16.7 | 60 | 1870 | 0.34 | 0.83 | 0.9544 | 27.8 |

*85° C. Partial Pressure of hydrogen/Partial Pressure of ethylene = 2/10 (atm/atm)

What is claimed is:

1. A process for polymerizing ethylene or copolymerizing ethylene with an δ-olefin in the presence of a catalyst comprising:

(A) a solid catalyst ingredient obtained by contacting
(1) a solid reaction product prepared by reacting:
(a) a reaction product of (i) an aluminum trihalide and (ii) at least one organic compound represented by general formulae (I), (II), (III) or (IV)

$$Si(OR^1)_a R^2{}_b \tag{I}$$

$$R^3(R^4{}_2SiO)_d SiR^5{}_3 \tag{II}$$

$$(R^6{}_2SiO)_e \tag{III}$$

$$R^7\text{—O—}R^8 \tag{IV}$$

wherein $R^1$, $R^2$, and $R^6$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of these hydrocarbon radicals substituted with at most 3 halogen atoms or alkoxy radicals having at most 20 carbon atoms, wherein $R^2$ further represents a hydrogen atom or a halogen atom, $R^3$, $R^4$ and $R^5$ are the same or different and represent the above-defined hydrocarbon radicals for $R^1$, $R^2$ or $R^6$, the substituted derivatives for $R^1$, $R^2$, or $R^6$, or a halogen atom, $R^7$ and $R^8$ are the same or different and represent a hydrocarbon radical having at most 10 carbon atoms selected from the group consisting of alkyl radicals, aryl radicals and aralkyl radicals, a+b is 4 with the proviso that a is not 0, d is an integer of from 1 to 1000 and e is an integer of from 2 to 1000; and (b) a magnesium alcoholate represented by general formula (V)

$$Mg(OR^9)_2 \tag{V}$$

wherein $R^9$ represents a hydrocarbon radical having at most 8 carbon atoms selected from the group consisting of alkyl radicals, cycloalkyl radicals, aryl radicals and aralkyl radicals, and washing with an inert organic solvent; with (2) a tetravalent titanium compound containing at least one halogen atom, represented by general formula (VI)

$$TiX^1{}_f(OR^{10})_g \tag{VI}$$

wherein $X^1$ represents a chlorine, bromine or iodine atom, $R^{10}$ represents a hydrocarbon radical having at most 12 carbon atoms selected from the group consisting of alkyl radicals, alkenyl radicals, cycloalkyl radicals, aryl radicals and aralkyl radicals, f+g is 4 where g is 0 or 1; and (B) an organoaluminum compound; where the amount of said aluminum trihalide (i) is from 0.25 to 4 moles per mole of said organic compound (ii), the amounts of said aluminum trihalide (i) and said organic compound (ii) are from 0.1 to 10 moles per mole of said magnesium alcoholate, respectively, and the amount of said tetravalent titanium compound (2) is from 0.1 to 200 moles per magnesium atom in said solid reaction product (1).

2. The process of claim 1 wherein said polymerizing or copolymerizing is carried out at a temperature of from $-10°$ to $200°$ C.

3. The process of claim 1 wherein said polymerizing or copolymerizing is carried out at a pressure from atmospheric pressure to 100 atmospheres.

4. The process of claim 1 wherein said polymerizing or copolymerizing is carried out in an inert organic solvent, the amount of said solid catalyst ingredient (A) being 1 mg to 1 g per liter of the inert organic solvent, and the amount of said organoaluminum compound (B) being 0.1 to 10 millimoles per liter of the inert organic solvent.

5. The process of claim 1, wherein said α-olefin contains at most 12 carbon atoms.

6. The process of claim 5, wherein the proportion of said α-olefin is at most 30 mol %.

7. The process of claim 5, wherein said α-olefin is propylene, butene-1, pentene-1, 4-methylpentene-1, hexene-1, octene-1 or decene-1.

8. The process of claim 1, wherein said reaction product (A) is obtained by reacting at a temperature of from $25°$ to $150°$ C.

9. The process of claim 1, wherein said reaction product (A) is obtained by reacting in an inert organic solvent.

10. The process of claim 1, wherein said solid reaction product (1) is prepared by reacting at a temperature of from $25°$ to $150°$ C.

11. The process of claim 1, wherein said solid reaction product (1) is prepared by reacting in an inert organic solvent.

12. The process of claim 9, wherein said inert organic solvent is an aliphatic hydrocarbon, alicyclic hydrocarbon or aromatic hydrocarbon, having a boiling point of from $50°$ to $200°$ C.

13. The process of claim 11, wherein said inert organic solvent is an aliphatic hydrocarbon, alicyclic hydrocarbon or aromatic hydrocarbon, having a boiling point of from $50°$ to $200°$ C.

14. The process of claim 1, wherein said reaction product (a) is obtained by reacting in an atmosphere of a dry inert gas.

15. The process of claim 1, wherein said solid reaction product (1) is obtained by reacting in an atmosphere of a dry inert gas.

16. The process of claim 1, wherein said aluminum trihalide (i) is aluminum trichloride.

17. The process of claim 1, wherein said organic compound (ii) is a compound represented by the general formula (I) in which $R^1$ and $R^2$ represent an alkyl radical having at most 8 carbon atoms, a phenyl radical or an aralkyl radical having at most 8 carbon atoms.

18. The process of claim 1, wherein said organic compound (ii) is a compound represented by the general formula (II) in which $R^3$, $R^4$ and $R^5$ represent an alkyl radical having at most 4 carbon atoms, a phenyl radical or a halogen atom, and d is not more than 4.

19. The process of claim 1, wherein said organic compound (ii) is a compound represented by the general formula (III) in which $R^6$ represents an alkyl radical having at most 4 carbon atoms, a phenyl radical or a vinyl radical, and e is not more than 10.

20. The process of claim 17, wherein said organic compound (ii) is tetramethoxysilane, dimethoxydimethylsilane, diethoxydimethylsilane, tetraethoxysilane, triethoxyethylsilane, diethoxydiethylsilane, ethoxytriethylsilane, tetrapropoxysilane, dipropoxydipropylsilane, tetraisopropoxysilane, diisopropoxydiisopropylsilane, dimethoxydiethylsilane, diethoxydibutylsilane, tetra-n-butoxysilane, di-n-butoxy-di-n-butylsilane, tetra-sec-butoxysilane, tetrahexylsilicate, tetraoctylsilicate, tetraphenoxysilane, tetracresylsilane, trimethoxychlorosilane, dimethoxydichlorosilane, dimethoxydibromosilane, triethoxychlorosilane, diethoxydibromosilane, dibutoxydichlorosilane, dicyclopentoxydiethylsilane, diethoxydiphenylsilane, 3,5-dimethylphenoxytrimethylsilane, methylphenyl-bis(2-chloroethoxy)silane, dimethoxydibenzylsilane, tri-n-propylallyloxysilane, allyltris(2-chloroethoxy)silane or trimethoxy-3-ethoxypropylsilane.

21. The process of claim 18, wherein said organic compound (ii) is hexamethyldisiloxane, octamethyltrisiloxane, tetracosamethylundecasiloxane, 3-hydroheptamethyltrisiloxane, hexaphenyldisiloxane, hexacyclohexyldisiloxane, 1,3-dimethyldisiloxane, hexaethyldisiloxane, octaethyltrisiloxane, hexapropyldisiloxane, 1,3-dichlorotetramethyldisiloxane, 1,3-bis(p-phenoxyphenyl)-1,3-dimethyl-1,3-diphenyldisiloxane, 1,3-diallytetramethyldisiloxane, 1,3-dibenzyltetramethyldisiloxane, 2,2,4,4-tetraphenyl-2,4-disila-1-oxacyclopentane, 1,1,3,3-tetramethyldisiloxane or hexachlorodisiloxane.

22. The process of claim 19, wherein said organic compound (ii) is 1,3,5-trimethylcyclotrisiloxane, hexamethylcyclotrisiloxane, octamethylcyclotetrasiloxane, pentamethylchlorocyclotrisiloxane, 1,3,5-trimethyltriphenylcyclotrisiloxane, hexaphenyltriphenylcyclotrisiloxane, 1,3,5-tribenzyltrimethylcyclotrisiloxane or 1,3,5-triallyltrimethylcyclotrisiloxane.

23. The process of claim 1, wherein said magnesium alcoholate (b) is magnesium methylate, magnesium ethylate, magnesium n-propylate, magnesium iso-propylate, magnesium butylate, magnesium hexylate, magnesium phenolate, magnesium cyclohexanolate, magnesium benzylalcoholate or magnesium cresolate.

24. The process of claim 1, wherein said magnesium alcoholate (b) is a compound represented by the general formula (V) in which $R^9$ represents an alkyl radical with at most 3 carbon atoms or a phenyl radical.

25. The process of claim 1, wherein said tetravalent titanium compound (2) is titanium tetrachloride, ethoxytitanium trichloride, propoxytitanium trichloride or butoxytitanium trichloride.

26. The process of claim 1, wherein said solid catalyst ingredient is obtained by contacting at a temperature of from $25°$ to $150°$.

27. The process of claim 1, wherein said organoaluminum compound (B) is represented by general formulae (IX), (X) or (XI)

$$AlR^{16}R^{17}R^{18} \tag{IX}$$

$$AlR^{19}{}_xX^4{}_y \tag{X}$$

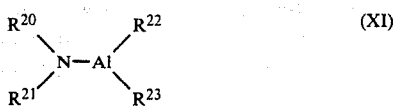

wherein $R^{16}$, $R^{17}$ and $R^{18}$, and $R^{20}$, $R^{21}$, $R^{22}$ and $R^{23}$ are the the same or different, $R^{16}$, $R^{17}$ and $R^{18}$ represent a hydrogen atom, a halogen atom or an alkyl radical or alkoxy radical having at most 8 carbon atoms, $R^{19}$ represents an alkyl radical having at most 8 carbon atoms, $R^{20}$, $R^{21}$ and $R^{22}$ represents an alkyl radical having at most 8 carbon atoms, $R^{23}$ represents a halogen atom or an alkyl radical having at most 8 carbon atoms and $X^4$ represents a halogen atom, with the proviso that at least one of $R^{16}$, $R^{17}$ and $R^{18}$ is an alkyl radical and the sum of x and y is 3, the amount of said organoaluminum compound being from 1 to 1000 moles per atom equivalent of titanium metal contained in said catalyst ingredient (A).

28. The process of claim 27, wherein said organoaluminum compound (B) is triethylaluminum, triisobutylaluminum, trihexylaluminum, diethylaluminum chloride, ethylaluminum sesquichloride, dibutylaluminum chloride, diethylaluminum hydride, diethylaluminum ethoxide, dibutylaluminum methoxide or diethylaluminum diethylamide.

29. The process of claim 27, wherein said organoaluminum compound (B) is a trialkyl aluminum having at most 6 carbon atoms.

30. A process for polymerizing ethylene or copolymerizing ethylene with an α-olefin in the presence of a catalyst comprising:
   (A) a solid catalyst ingredient obtained by contacting
      (1) a solid reaction product prepared by reacting:
         (a) a reaction product of (i) an aluminum trihalide and (ii) at least one organic compound represented by general formulae (i), (II), (III) or (IV)

$$Si(OR^1)_a R_b^2 \qquad (I)$$

$$R^3(R_2^4SiO)_d SiR_3^5 \qquad (II)$$

$$(R_2^6 SiO)_e \qquad (III)$$

$$R^7-O-R^8 \qquad (IV)$$

wherein $R^1$, $R^2$ and $R^6$ are the same or different and represent a hydrocarbon radical having at most 20 carbon atoms selected from the group consisting of alkyl radicals, alkenyl radicals, cycloalkyl radicals, aryl radicals and aralkyl radicals and derivatives of these hydrocarbon radicals substituted with at most 3 halogen atoms or alkoxy radicals having at most 20 carbon atoms, wherein $R^2$ further represents a hydrogen atom, or a halogen atom, $R^3$, $R^4$, and $R^5$ are the same or different and represent the above-defined hydrocarbon radicals for $R^1$, $R^2$ or $R^6$, the substituted derivatives for $R^1$, $R^2$ or $R^6$, or a halogen atom, $R^7$ and $R^8$ are the same or different and represent a hydrocarbon radical having at most 10 carbon atoms selected from the group consisting of alkyl radicals, aryl radicals and aralkyl radicals, a+b is 4 with the proviso that a is not 0, d is an integer of from 1 to 1000 and e is an integer of from 2 to 1000; and (b) a magnesium alcoholate represented by general formula (V)

$$Mg(OR^9)_2 \qquad (V)$$

wherein $R^9$ represents a hydrocarbon radical having at most 8 carbon atoms selected from the group consisting of alkyl radicals, cycloalkyl radicals, aryl radicals and aralkyl radicals, and washing with an inert organic solvent; with both (2) a tetravalent titanium compound containing at least one halogen atom, represented by general formula (VI)

$$TiX_f^1(OR^{10})_g \qquad (VI)$$

wherein X represents a chlorine, bromine or iodine atom, $R^{10}$ represents a hydrocarbon radical having at most 12 carbom atoms selected from the group consisting of alkyl radicals, alkenyl radicals, cycloalkyl radicals, aryl radicals and aralkyl radicals, f+g is 4 where g is 0 or 1;

(3) at least one electron donor compound represented by the general formulae (I), (II), (III), or (IV) as defined above or by general formulae (VII) or (VIII)

$$X_l^2 Y_m P(OR^{14})_n \qquad (VII)$$

$$X_q^3 Y_r P(O)(OR^{14})_s \qquad (VIII)$$

wherein the sum of l, m and n, or the sum of q, r and s is 3, $0 \leq l$, $m < 3$, $0 < n \leq 3$, and $R^{14}$ and $R^{15}$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of said hydrocarbon radicals substituted with at most 3 halogen atoms or alkoxy radicals or aryloxy radicals having at most 20 carbon atoms, $X^2$, $X^3$ and Y are the same or different and represent a hydrogen atom, a halogen atom or said hydrocarbon radical or its substituted derivatives as defined for $R^{14}$ and $R^{15}$; and (B) an organoaluminum compound; where the amount of said aluminum trihalide (i) is from 0.25 to 4 mols per mole of said organic compound (ii), the amounts of said aluminum trihalide (i) and said organic compound (ii) are from 0.1 to 10 moles per mole of said magnesium alcoholate, respectively, the amount of said tetravalent titanium compound (2) is from 0.1 to 200 moles per magnesium atom in said solid reaction product (1), and the amount of said electron donor compound (3) is from 0.05 to 5 moles per mole of said tetravalent titanium compound (2).

31. The process of claim 30 wherein said polymerizing or copolymerizing is carried out at a temperature of from −10° to 200° C.

32. The process of claim 30, wherein said polymerizing or copolymerizing is carried out at a pressure of from atmospheric pressure to 100 atmospheres.

33. The process of claim 30 wherein said polymerizing or copolymerizing is carried out in an inert organic solvent, the amount of said solid catalyst ingredient (A) being 1 mg to 1 g per liter of the inert organic solvent, and the amount of said organoaluminum compound (B)

being 0.1 to 10 millimoles per liter of the inert organic solvent.

34. The process of claim 30, wherein said α-olefin contains at most 12 carbon atoms.

35. The process of claim 34, wherein the proportion of said α-olefin is at most 30 mol %.

36. The process of claim 34, wherein said α-olefin is propylene, butene-1, pentene-1, 4-methylpentene-1, hexene-1, octene-1 or decene-1.

37. The process of claim 30, wherein said reaction product (A) is obtained by reacting at a temperature of from 25° to 150° C.

38. The process of claim 30, wherein said reaction product (a) is obtained by reacting in an inert organic solvent.

39. The process of claim 30, wherein said solid reaction product (1) is prepared by reacting at a temperature of from 25° to 150° C.

40. The process of claim 30, wherein said solid reaction product (1) is prepared by reacting in an inert organic solvent.

41. The process of claim 38, wherein said inert organic solvent is an aliphatic hydrocarbon, alicyclic hydrocarbon or aromatic hydrocarbon, having a boiling point of from 50° to 200° C.

42. The process of claim 40, wherein said inert organic solvent is an aliphatic hydrocarbon, alicyclic hydrocarbon or aromatic hydrocarbon, having a boiling point of from 50° to 200° C.

43. The process of claim 30, wherein said solid reaction product (1) is obtained by reacting in an atmosphere of a dry inert gas.

44. The process of claim 30, wherein said solid reaction product (1) is obtained by reacting in an atmosphere of a dry inert gas.

45. The process of claim 30, wherein said aluminum trihalide (i) is aluminum trichloride.

46. The process of claim 30, wherein said organic compound (ii) is a compound represented by the general formula (I) in which $R^1$ and $R^2$ represent an alkyl radical having at most 8 carbon atoms, a phenyl radical or an aralkyl radical having at most 8 carbon atoms.

47. The process of claim 30, wherein said organic compound (ii) is a compound represented by the general formula (II) in which $R^3$, $R^4$ and $R^5$ represent an alkyl radical having at most 4 carbon atoms, a phenyl radical or a halogen atom, and d is not more than 4.

48. The process of claim 30, wherein said organic compound (ii) is a compound represented by the general formula (III) in which $R^6$ represents an alkyl radical having at most 4 carbon atoms, a phenyl radical or a vinyl radical, and e is not more than 10.

49. The process of claim 46, wherein said organic compound (ii) is tetramethoxysilane, dimethoxydimethylsilane, diethoxydimethylsilane, tetraethoxysilane, triethoxyethylsilane, diethoxydiethylsilane, ethoxytriethylsilane, tetrapropoxysilane, dipropoxydipropylsilane, tetraisopropoxysilane, diisopropoxydiisopropylsilane, dimethoxydiethylsilane, diethoxydibutylsilane, tetra-n-butoxysilane, di-n-butoxy-di-n-butylsilane, tetrasec-butoxysilane, tetrahexylsilicate, tetraoctylsilicate, tetraphenoxysilane, tetracresylsilane, trimethoxychlorosilane, dimethoxydichlorosilane, dimethoxydibromosilane, triethoxychlorosilane, diethoxydibromosilane, dibutoxydichlorosilane, dicyclopentoxydiethylsilane, diethoxydiphenylsilane, 3,5-dimethylphenoxytrimethylsilane, methyplhenyl-bis(2-chloroethoxy)silane, dimethoxydibenzylsilane, tri-n-propylallyloxysilane, allyltris(2-chloroethoxy)silane or trimethoxy-3-ethoxypropylsilane.

50. The process of claim 47, wherein said organic compound (ii) is hexamethyldisiloxane, octamethyltrisiloxane, tetracosamethylundecasiloxane, 3-hydroheptamethyltrisiloxane, hexaphenyldisiloxane, hexacyclohexyldisiloxane, 1,3-dimethyldisiloxane, hexaethyldisiloxane, octaethyltrisiloxane, hexapropyldisiloxane, 1,3-dichlorotetramethyldisiloxane, 1,3-bis(p-phenoxyphenyl)-1,3-dimethyl-1,3-diphenyldisiloxane, 1,3-diallytetramethyldisiloxane, 1,3-dibenzyltetramethyldisiloxane, 2,2,4,4-tetraphenyl-2,4-disila-1-oxacyclopentane, 1,1,3,3-tetramethyldisiloxane or hexachlorodisiloxane.

51. The process of claim 48, wherein said organic compound (ii) is 1,3,5-trimethylcyclotrisiloxane, hexamethylcyclotrisiloxane, octamethylcyclotetrasiloxane, pentamethylchlorocyclotrisiloxane, 1,3,5-trimethyltriphenylcyclotrisiloxane, hexaphenyltriphenylcyclotrisiloxane, 1,3,5-tribenzyltrimethylcyclotrisiloxane or 1,3,5-triallyltrimethylcyclotrisiloxane.

52. The process of claim 30, wherein said magnesium alcoholate (b) is magnesium methylate, magnesium ethylate, magnesium n-propylate, magnesium iso-propylate, magnesium butylate, magnesium hexylate, magnesium phenolate, magnesium cyclohexanolate, magnesium benzylalcoholate or magnesium cresolate.

53. The process of claim 30, wherein said magnesium alcoholate (b) is a compound represented by the general formula (V) in which $R^9$ represents an alkyl radical with at most 3 carbon atoms or a phenyl radical.

54. The process of claim 30, wherein said tetravalent titanium compound (2) is tatanium tetrachloride, ethoxytitanium trichloride, propoxytitanium trichloride or butoxytitanium trichloride.

55. The process of claim 30, wherein said electron donor compound (3) is a compound represented by the general formula (II) in which $R^1$ and $R^2$ represent an alkyl radical having at most 8 carbon atoms, a phenyl radical or an aralkyl radical having at most 8 carbon atoms.

56. The process of claim 30, wherein said electron donor compound (3) is a compound represented by the general formula (II) in which $R^3$, $R^4$ and $R^5$ represent an alkyl radical having at most 4 carbon atoms, a phenyl radical or a halogen atom and d is not more than 4.

57. The process of claim 30, wherein said electron donor compound (3) is a compound represented by the general formula (III) in which $R^6$ represents an alkyl radical having at most 4 carbon atoms, a phenyl radical or a vinyl radical, and e is not more than 10.

58. The process of claim 55, wherein said electron donor compound (3) is tetramethoxysilane, dimethoxydimethylsilane, diethoxydimethylsilane, tetraethoxysilane, triethoxyethylsilane, diethoxydiethylsilane, ethoxytriethylsilane, tetrapropoxysilane, dipropoxydipropylsilane, tetraisopropoxysilane, diisopropoxydiisopropylsilane, dimethoxydiethylsilane, diethoxydibutylsilane, tetra-n-butoxysilane, di-n-butoxy-di-n-butylsilane, tetrasecbutoxysilane, tetrahexylsilicate, tetraoctylsilicate, tetraphenoxysilane, tetracresylsilane, trimethoxychlorosilane, dimethoxydichlorosilane, dimethoxydibromosilane, triethoxychlorosilane, diethoxydibromosilane, dibutoxydichlorosilane, dicyclopentoxydiethylsilane, diethoxydiphenylsilane, 3,5-dimethylphenoxytrimethylsilane, methylphenyl-bis(2-chloroethoxy)silane, dimethoxydibenzylsilane, tri-n-propylallyloxysilane, allyltris(2-chloroethoxy)silane or trimethoxy-3-ethoxypropylsilane.

59. The process of claim 56, wherein said electron donor compound (3) is hexamethyldisiloxane, octamethyltrisiloxane, tetracosamethylundecasiloxane, 3-hydroheptamethyltrisiloxane, hexaphenyldisiloxane, hexacyclohexyldisiloxane, 1,3-dimethyldisiloxane, hexaethyldisiloxane, octaethyltrisiloxane, hexapropyldisiloxane, 1,3-dichlorotetramethyldisiloxane, 1,3-bis(p-phenoxyphenyl)-1,3-dimethyl-1,3-diphenyldisiloxane, 1,3-diallytetramethyldisiloxane, 1,3-dibenzyltetramethyldisiloxane, 2,2,4,4-tetraphenyl-2,4-disila-1-oxacyclopentane, 1,1,3,3-tetramethyldisiloxane or hexachlorodisiloxane.

60. The process of claim 57, wherein said electron donor compound (3) is 1,3,5-trimethylcyclotrisiloxane, hexamethylcyclotrisiloxane, octamethylcyclotetrasiloxane, pentamethyl chlorocyclotrisiloxane, 1,3,5-trimethyltriphenylcyclotrisiloxane, hexaphenyltriphenylcyclotrisiloxane, 1,3,5-tribenzyltrimethylcyclotrisiloxane or 1,3,5triallyltrimethylcyclotrisiloxane.

61. The process of claim 30, wherein said electron donor compound (3) is a compound respresented by the general formula (VII) in which $R^{14}$ represents a hydrocarbon radical containing at most 8 carbon atoms.

62. The process of claim 30, wherein said electron donor compound (3) is a compound represented by the general formula (VIII) in which $R^{15}$ represents a hydrocarbon radical containing at most 8 carbon atoms.

63. The process of claim 61, wherein said electron donor compound (3) is triethyl phosphite, triphenyl phosphite, diphenyl ethylphosphonite, diethyl phosphonite, diethylbutyl phosphonite, dibutyl chlorophosphite or diphenyl chlorophosphite.

64. The process of claim 62, wherein said electron donor compound (3) is triphenylphosphine oxide, tributyl phosphine oxide, ethyl diphenylphosphinate, diphenyl methylphosphonate, phenyl phosphorodichloridate, phenylphosphonic dichloridate, propylphosphonic dichloride, triphenyl phosphate or tributyl phosphate.

65. The process of claim 30, wherein said solid catalyst ingredient is obtained by contacting at a temperature of from 25° to 150° C.

66. The process of claim 30, wherein said organoaluminum compound (B) is represented by general formulae (IX), (X) or (XI)

$$AlR^{16}R^{17}R^{18} \qquad (IX)$$

$$AlR^{19}{}_xX^4{}_y \qquad (X)$$

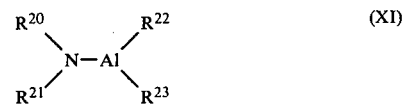   (XI)

wherein $R^{16}$, $R^{17}$ and $R^{18}$, and $R^{20}$, $R^{21}$, $R^{22}$ and $R^{23}$ are the the same or different, $R^{16}$, $R^{17}$ and $R^{18}$ represent a hydrogen atom, a halogen atom or an alkyl radical or alkoxy radical having at most 8 carbon atoms, $R^{19}$ represents an alkyl radical having at most 8 carbon atoms, $R^{20}$, $R^{21}$ and $R^{22}$ represents an alkyl radical having at most 8 carbon atoms, $R^{23}$ represents a halogen atom or an alkyl radical having at most 8 carbon atoms and $X^4$ represents a halogen atom, with the proviso that at least one of $R^{16}$, $R^{17}$ and $R^{18}$ is an alkyl radical and the sum of x and y is 3, the amount of said organoaluminum compound being from 1 to 1000 moles per atom equivalent of titanium metal contained in said catalyst ingredient (A).

67. The process of claim 66, wherein said organoaluminium compound (B) is triethylaluminum, triisobutylaluminum, trihexylaluminum, diethylaluminum chloride, ethylaluminum sesquichloride, dibutylaluminum chloride, diethylaluminum hydride, diethylaluminum ethoxide, dibutylaluminum methoxide or diethylaluminum diethylamide.

68. The process of claim 66, wherein said organoaluminum compound (B) is a trialkyl aluminum having at most 6 carbon atoms.

* * * * *